April 15, 1930.                L. E. SATER                1,754,574
               ELECTRIC DEVICE FOR COOKING FOOD OR THE LIKE
                          Filed Feb. 1, 1929

Inventor
Lenore E. Sater
By M. Talbert Lick
   Attorney

Patented Apr. 15, 1930

1,754,574

UNITED STATES PATENT OFFICE

LENORE E. SATER, OF AMES, IOWA, ASSIGNOR TO IOWA STATE COLLEGE OF AGRICULTURAL AND MECHANICAL ARTS, OF AMES, IOWA, A CORPORATION OF IOWA

ELECTRIC DEVICE FOR COOKING FOOD OR THE LIKE

Application filed February 1, 1929. Serial No. 336,903.

The principal object of this invention is to provide an electrical device for cooking food such as vegetables, meat and the like, that is economical in manufacture and operation.

A further object of this invention is to provide a device that cooks edibles thoroughly and in a short space of time.

A still further object of this invention is to provide a device for cooking food that creates a much higher temperature in the food than is realized by the present method of cooking.

A still further object of this invention is to provide a durable electric cooking device that has a high safety factor and is provided with a visible means for determining whether or not the same is operating.

A still further object of this invention is to provide an electric cooking device having a container for holding the food that is readily removable to facilitate the filling of the container with food or the emptying of cooked food therefrom.

More specifically, the object of this invention is to provide a device for cooking food wherein the electric current is applied directly to the material to be cooked and the desired heat is produced by the material itself acting as a resistance to the flow of the electric current.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

The present method of electrically cooking food employs a metallic resistance to the flow of the electric current and the heat thus generated is tapped by suitable means and then applied to the food. By such a system of obtaining heat from electric energy, much valuable and costly heat units are lost, considerable time is expended before the food is brought to cooking temperature and extreme high temperature in the food is impossible. I have overcome these objections as will be appreciated by those familiar with the art.

Figure 1:
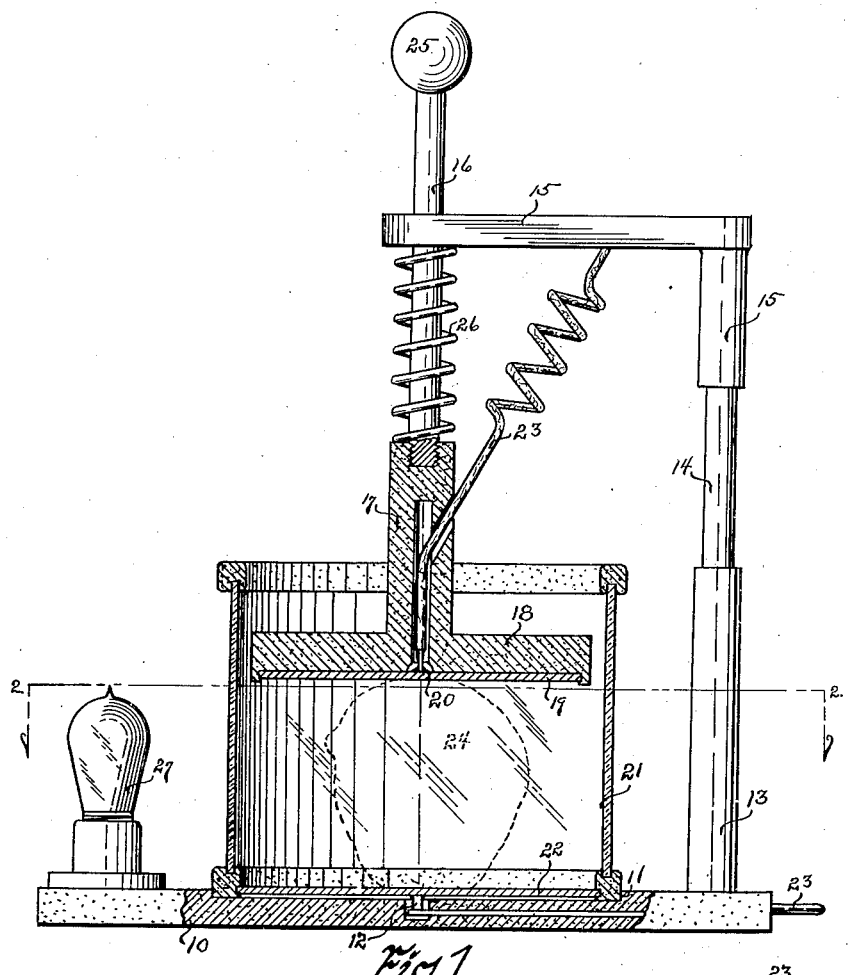
Fig. 1 is a side view of my complete invention ready for use with sections cut away to more thoroughly illustrate its interior construction.
Figure 2:
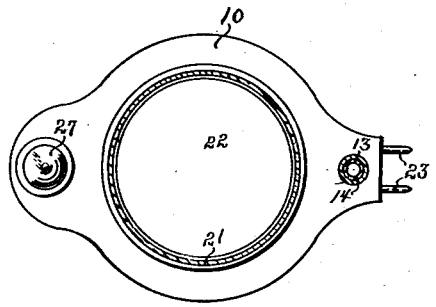
Fig. 2 is a top plan sectional view of the device and is taken on line 2—2 of Fig. 1.
Figure 3:
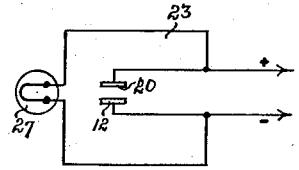
Fig. 3 is a diagrammatic view of the electrical wiring of the device.

I have used the numeral 10 to designate the base portion of my device made of nonconductive material and having a depression 11 in its upper surface. Near the center of this depression and extending from the base is an electric contact point 12, as shown in Fig. 1. Vertically rising from the base 10 is a hollow post 13, slidably and rotatably mounted in which is a shaft 14. Secured by suitable means to the upper portion of this shaft is a horizontal arm 15. Slidably mounted in the free end of the arm 15 is the rod 16, having its lower end secured by suitable means to the member 17. Integrally formed on the lower end of the member 17 is the disk 18 of nonconductive material. On the under side of the disk and inset, as shown in the drawings, is the metallic plate 19 which acts as one of the electrodes and is in electrical communication with the contact point 20 in the disk 18.

The numeral 21 designates a container having side walls of nonconductive material and preferably of transparent or translucent material, in order that the food or material being cooked therein may be visibly observed by the operator. This container is designed to rest in and engage the depression 11 and has its bottom 22 making electrical contact with the contact point 12 when the container is resting in the depression 11, as shown in Fig. 1. This bottom 22 is of conductive material and acts as the second electrode. The contact points 12 and 20 are, by the electric cords 23, in electric communication with a suitable source of electric energy not shown.

It should here be noted that the disk 18 has an outside diameter less than the inside diameter of the container 21 in order that the disk carrying the electrode 19 may enter the container as shown in Fig. 1 and engage the food to be cooked in the container. In the drawings I have designated the food by dotted lines and by the numeral 24. This food or material to be cooked or heated is placed in the container and engages the bottom of the container which acts as one of the electrodes, and the disk 18 is then lowered into the container until the plate 19 engages the upper portion of the food. If electric energy is passed through the circuit wires 23, the current must pass from one of the electrodes, through the food to the opposite electrode in which instance the food will act as a resistance to the flow of electric energy and heat will be produced in the food, thereby raising the same to an intense internal temperature and cooking will result.

After the food has been cooked the disk 18 carrying the electrode 19 is lifted from the food and from the container 21, thereby breaking the circuit. This operation is facilitated by the handle member 25, which also provides weight for holding the electrode 19 firmly on the upper surface of the food to be cooked. The weight of the shaft 14, and arm 15 resting on the spring 26 embracing the rod 16 also aids in causing the electrode 19 to make proper contact with the food in the container. By the shaft 14 being both slidably and rotatably mounted in the post 13, the complete assembly carried by the arm 15 may be elevated and swung to one side. The handle member 25 also prevents the rod 16 from sliding out of the arm 15.

In order to visibly ascertain if electric energy exists in the circuit 23 and the device is in condition to cook food, I have provided the incandescent light bulb 27 in the circuit.

The electrodes 19 and 22 should be of non-corrosive metal to prevent rusting and the like. In case of very dry foods or when moist heat is desired, water should be placed in the container with the food.

The best results are obtained when alternating electric current is used having a voltage of one hundred ten or more.

Some changes may be made in the construction and arrangement of my electric device for cooking food or like without departing from the real spirit and purpose of my invention, and it is my intention to cover by my claims any modified forms of structure or use of equivalents which may be reasonably included within their scope.

I claim:

1. In a device of the class described, a base member, a depression in said base member, a contact point in said depression, a container capable of engaging said depression and having its bottom engage said contact point, a disk capable of entering the said container, a contact point in said disk, a plate on said disk engaging said contact point in said disk, and a source of electric energy making contact with one of said contact points.

2. In a device of the class described, a base member, a contact point on said base member, a container having a metallic bottom capable of engaging said contact point when said container is resting on said base member, a bracket secured to said base member, a rod slidably mounted in said bracket, a disk member secured to said rod and capable of entering said container when said rod is slid in one direction, a contact point in said disk, and a source of electric energy in communication with one of said contact points.

3. In a device of the class described, a base member, a contact point on said base member, a container having a metallic bottom capable of engaging said contact point when said container is resting on said base member, a vertical hollow post secured to said base member, a shaft rotatably and slidably mounted in said post, an arm secured to said shaft, a rod slidably mounted in said arm, a disk member of nonconductive material secured to said arm and capable of entering said container when said arm is moved in one direction, a depression on one side of said disk, a contact point in said depression, a plate in said depression and making contact with said contact point in said disk, and a source of electric energy in communication with one of said contact points.

4. In a device of the class described, a base member, a contact point on said base member, a container having a conductive bottom capable of engaging said contact point when the container is placed over said contact point, a conductive member capable of being moved to a position in said container, said last mentioned member designed to be in communication with a source of electric energy.

5. In a device of the class described, a base member, a contact point on said base member, a container open at its top and having a bottom of conductive material capable of engaging said contact point, and a disk capable of entering the said container and of conductive material; said disk designed to be placed in electrical communication with a source of electric energy.

6. In a device of the class described, a base member, an electrical contact point on said base member, a container having walls of nonconductive material and a bottom of conductive material capable of engaging said contact point, and a flat member of conductive material capable of entering said container; said last mentioned member and the bottom of said container designed to have an electrical current pass between them by way of food placed between the same.

7. In a device of the class described, a base member, a contact point on said base member, a container having a metallic bottom and capable of engaging said contact point when said container is placed on said base member, a disk member capable of entering said container and of non-conductive material, a depression in one side of said disk, and a metallic disk in said depression and designed to be in communication with a source of electric energy.

8. In a device of the class described, a base member, a depression in said base member, an electrical contact point in said depression, a container capable of engaging said depression and having its bottom engaging said contact point, a disk capable of entering said container, an electric circuit engaging said disk and the bottom of said container, and an incandescent light bulb in said circuit for informing the operator when said circuit is energized by electrical energy.

LENORE E. SATER.